(12) United States Patent
Adsitt

(10) Patent No.: US 7,463,594 B2
(45) Date of Patent: Dec. 9, 2008

(54) PROVIDING A STATIC INTERNET PROTOCOL ADDRESS POINTER TO A COMPUTER HAVING A DYNAMIC INTERNET PROTOCOL ADDRESS

(75) Inventor: Terrence Lee Adsitt, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 677 days.

(21) Appl. No.: 11/087,133

(22) Filed: Mar. 22, 2005

(65) Prior Publication Data

US 2005/0207404 A1  Sep. 22, 2005

Related U.S. Application Data

(60) Provisional application No. 60/555,514, filed on Mar. 22, 2004.

(51) Int. Cl.
*H04L 12/26* (2006.01)
*H04L 12/56* (2006.01)

(52) U.S. Cl. .................. 370/252; 370/389; 370/400

(58) Field of Classification Search ............... 370/252, 370/254, 352, 389, 400, 401, 475
See application file for complete search history.

(56) References Cited

U.S. PATENT DOCUMENTS

| | | | | |
|---|---|---|---|---|
| 5,905,736 | A * | 5/1999 | Ronen et al. | 370/546 |
| 6,370,584 | B1 * | 4/2002 | Bestavros et al. | 709/238 |
| 6,560,216 | B1 * | 5/2003 | McNiff et al. | 370/349 |
| 6,977,917 | B2 * | 12/2005 | Skog et al. | 370/349 |
| 7,068,597 | B1 * | 6/2006 | Fijolek et al. | 370/230 |
| 7,339,920 | B2 * | 3/2008 | Skog et al. | 370/349 |
| 2001/0019557 | A1 * | 9/2001 | Hrastar et al. | 370/401 |
| 2001/0028636 | A1 * | 10/2001 | Skog et al. | 370/328 |
| 2001/0047406 | A1 * | 11/2001 | Araujo et al. | 709/223 |
| 2002/0159442 | A1 * | 10/2002 | Quigley et al. | 370/352 |
| 2003/0123465 | A1 * | 7/2003 | Donahue | 370/401 |

* cited by examiner

*Primary Examiner*—Hong Sol Cho (57) ABSTRACT

Providing packet forwarding to a connected customer computer that does not have a static Internet Protocol (IP) address. A service provider computer receives a packet for the connected customer computer. The service provider computer then determines a current IP address of the connected customer computer. A new packet containing the current IP address of the connected customer computer is then generated by the service provider computer. The service provider computer then transmits the new packet to the connected customer computer.

19 Claims, 9 Drawing Sheets

PROVIDING A STATIC INTERNET PROTOCOL ADDRESS POINTER TO A COMPUTER HAVING A DYNAMIC INTERNET PROTOCOL ADDRESS

CROSS-REFERENCE TO RELATED APPLICATIONS AND CLAIM OF PRIORITY

Priority of U.S. Provisional patent application Ser. No. 60/555,514 filed on Mar. 22, 2004 is claimed.

TECHNICAL FIELD

This invention relates to a service provider server that connects to a customer server to provide Internet access to the customer server.

BACKGROUND OF THE INVENTION

In today's society, the Internet has become an important means of communication. The Internet is a network of interconnected computers that allow two computers to transmit data packets between one another to communicate and share information. Computers may be connected to other computers on the Internet by traditional analog telephone line connections, coaxial connections, T1 communications line, T3 line communications line, digital subscriber line service, or any other communications medium used to connect computer systems.

As the Internet has become a more popular form of communication, businesses desire to be connected to the Internet to provide services to customers and reach a broader market with advertising. In the past, businesses have used service provider servers to maintain websites for both advertising and providing service. Service provider servers are servers maintained by a third party that are permanently connected to the Internet to provide internet connections to users that connect to the service providers servers via traditional connections, such as a modem connection via a telephone line. America On-Line and CompuServe are examples of third parties that provide service provider servers.

Recently, the amount of e-commerce has been expanding at an exponential rate. Therefore, businesses desire to connect their own server to the Internet to provide services and advertisements to users of the Internet. However, a business must have a dedicated communications line to maintain connection to the Internet. A common type of dedicated line to the Internet is a T1 communications line. It is a problem that a typical T1 connection costs anywhere from five hundred dollars ($500) to fifteen hundred dollars ($1500). This is a substantial expense considering that a traditional Digital Subscriber Line (DSL) connection to an Internet provider can cost in the range of thirty dollars ($30) to one hundred and fifty dollars ($150).

The problem with a DSL connection is that the connection is not permanent. Typically, a business or other user uses the DSL line to connect to a service provider server that is a Dynamic Host Configuration Protocol (DHCP) server. A DHCP server is a server that establishes a connection with a computer system, such as a server for a business and assigns the computer system a temporary IP address. It is a problem that this temporary address for the computer system, such as a server for business, may take from three days to three weeks to propagate out to other servers for resolution of the IP address for the computer system. This amount of time is unacceptable for a business that wishes to maintain business over the Internet. Therefore, there is a need for a system that would allow a business to maintain a cheaper Internet connection, such as a DSL connection, while maintaining a constant connection to the Internet with a permanent or static IP address.

SUMMARY OF THE INVENTION

Apparatus and method for providing packet forwarding to a connected customer computer that does not have a static Internet Protocol (IP) address. A service provider computer receives a packet for the connected customer computer. The service provider computer then determines a current IP address of the connected customer computer. A new packet containing the current IP address of the connected customer computer is then generated by the service provider computer. The service provider computer then transmits the new packet to the connected customer computer.

BRIEF DESCRIPTION OF THE DRAWING

The above and other advantages of this invention may be understood from the detailed description below and following drawings.

DETAILED DESCRIPTION

An embodiment of the present invention is a system that provides a static Internet Protocol Address pointer to a server having a dynamic IP address. The present invention is provided by software executed on a service provider server and software executed on a connected customer computer (also referred to as a connected customer server). For purposes of this discussion, service provider computer (also referred to as a service provider server) is a computer system that is maintained by a third party to provide Internet connections to users that use a traditional dial-up or Digital Subscriber Line (DSL) connection between a computer system and a connected customer server is a server maintained by a user that establishes a communication line connection to a service provider server to establish a connection to the Internet. One skilled in the art will envision that the present invention may be implemented by instructions for processes that are executed by the connected customer server and SPS and stored as either software or firmware on the service provider server and/or the connected customer server.

Figure 1:
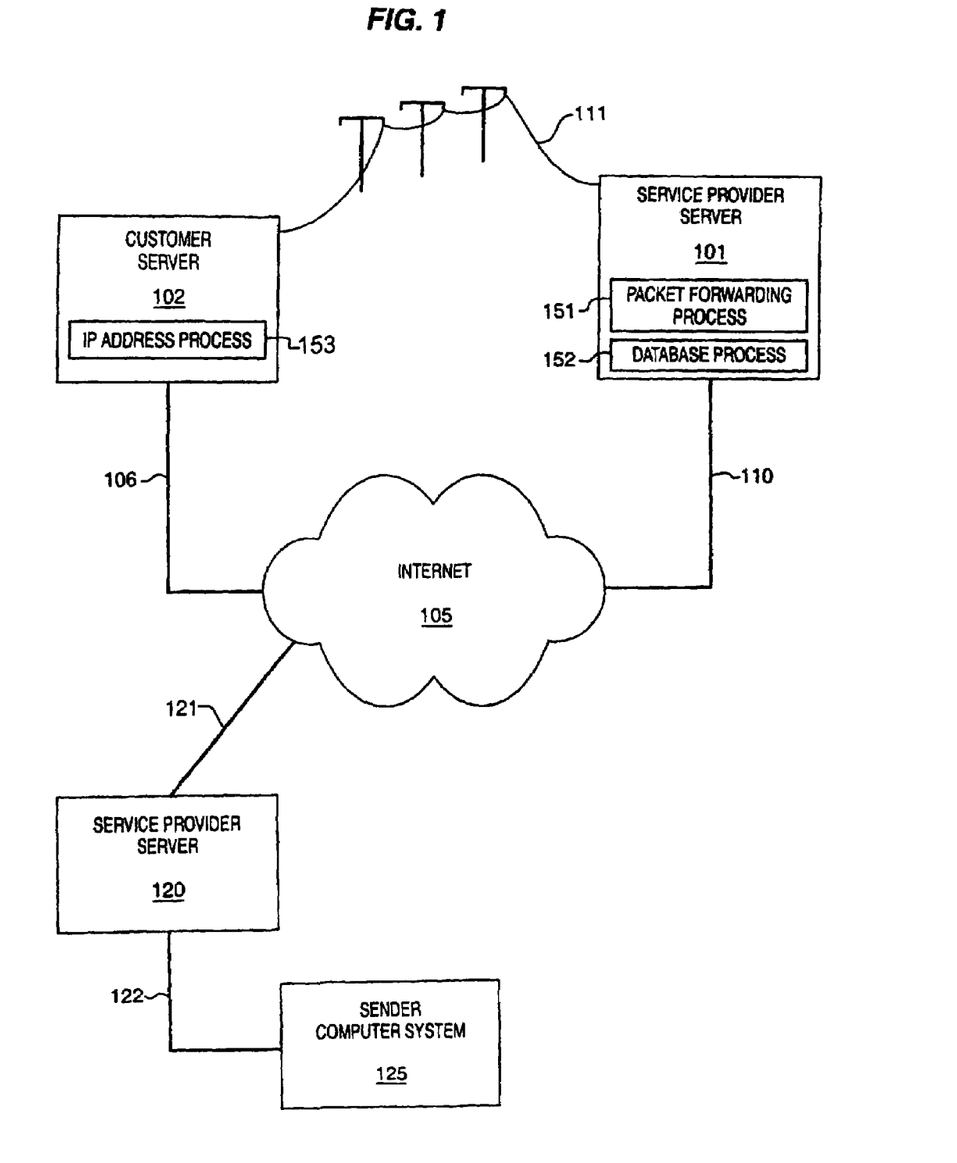
FIG. 1 illustrating an embodiment of a connection to the Internet of a connected customer server and service provider server.

FIG. 1 illustrates a diagram of a service provider server 101 and a connected customer server 102 connected to the Internet 105. Connected customer server 102 establishes a communication connection with service provider server 101 via telephone line 111. The communication connection may be a conventional dial-up connection using a typical modem as a communication device, a DSL connection, or any other form of connection that allows for communication between two computer systems. Connected customer server 101 is a computer system maintained by a user to provide Internet based applications such as e-mail and web pages that may be accessed via the Internet.

Service provider server 101 establishes communication connection to computer systems of the user via telephone lines 111 to provide an Internet connection to the users. Service provider server 101 is connected to other computer systems on Internet 105 via communications path 110. Communications path 110 is a permanent communication path that allows high speed transfer of data between computer systems. One skilled in the art will note that communications path 110 may be several connections to several different computers systems on the Internet.

A second service provider server 120 is connected to the Internet via communications path 121. Communications path 121, like communications path 110, is a high speed data transfer line that provides for a continuous connection to other computer systems on the Internet. Second service provider server 120 is shown for exemplary purposes.

Sender computer system 125 is a computer system connected to second service provider 120 via communications path 122. One skilled in the art will recognize that communications path 122 may be any media for connecting computer systems to provide data transfers and is not pertinent to this invention. Sender computer system 125 is shown for exemplary purposes and may be connected to the Internet in many other ways including, but not limited to, a connection to service provider server 101 or as a separate node on the Internet.

The present invention may be executed by as many as three separate processes. The first process is the packet forwarding processes 151 executed by service provider server 101. Database processes 152 executed by service provider server 101 provide a system for storing current IP addresses of connected customer servers. A third process 153 for requesting an update of the current IP address of a connected customer server is executed by connected customer server 102 and provides a process for updating a current IP address of the connected customer server 102. Those skilled in the art will recognize that process 153 may also be executed by a server which assigns current IP addresses, such as a DHCP server, which may or may not be the same server as service provider server 101.

Figure 2:
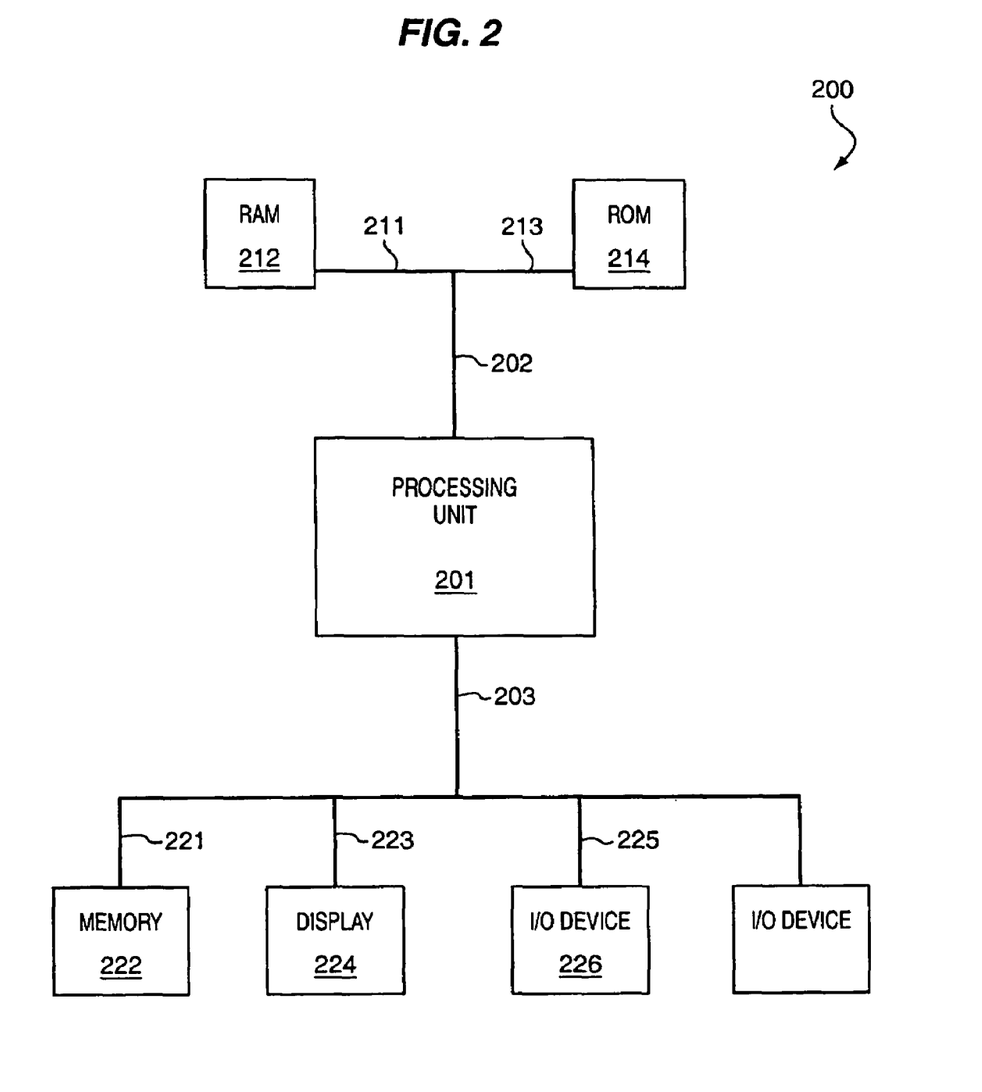
FIG. 2 illustrating an embodiment of a processing system that may be either a service provider server and/or a connected customer server.

FIG. 2 illustrates a block diagram of a typical processing unit 200 that is representative of a computer system that may be used as either service provider server 101 or connected customer server 102. Processing unit 200 has a processor 201 that executes instructions stored in a memory to perform applications, such as the processes of the present invention. Processor 201 may be any conventional processor, microprocessor or a series of processors operatively connected to perform a series of instructions.

Processor 201 is connected to a memory bus 202 to read instructions and data from memory and to write data to memory. Random Access Memory (RAM) 212 is a volatile memory connected to memory bus 202 via path 211. RAM 212 stores instructions currently being executed by processor 201 and the data needed to perform the instructions. Read Only Memory (ROM) 214 is connected to memory bus 202 via path 213. ROM 214 stores configuration and operating system information needed by processor 201 to execute system routines to allow processing unit 200 to perform applications.

Processor 201 is also connected to Input/Output ("I/O") bus 203. I/O bus 203 connects processor 201 to periphery devices to allow processor 201 to transmit data to and receive data from periphery devices. Some exemplary devices connected to I/O bus 203 include but are not limited to memory 222, display 224, I/O device 226, and I/O device 228. Memory 222 is connected to I/O bus 203 via path 221 and stores data and instructions for applications that can be executed by processor 201. An example of memory 222 is a magnetic disk drive that reads data from and writes data to a magnetic disk. Display 224 is connected to I/O bus 203 via path 223 and is a device and connected driver that can receive data from processor 201 and display the data in a user understandable manner. For example, display 224 may be a monitor and a video card connected to the bus. Display 224 may also be a device that provides audible sounds from received data.

I/O device 226 is connected to I/O bus 203 via path 225. I/O device 226 is a device that may either receive input data or output data to a user or other machine.

Some examples of I/O device 226 include but are not limited to a keyboard, a mouse, a microphone, a Local Area Network (LAN) connection, modem, or equivalent device. I/O device 228 is a second I/O device and is connected to I/O bus 203 via path 213.

Figure 3:
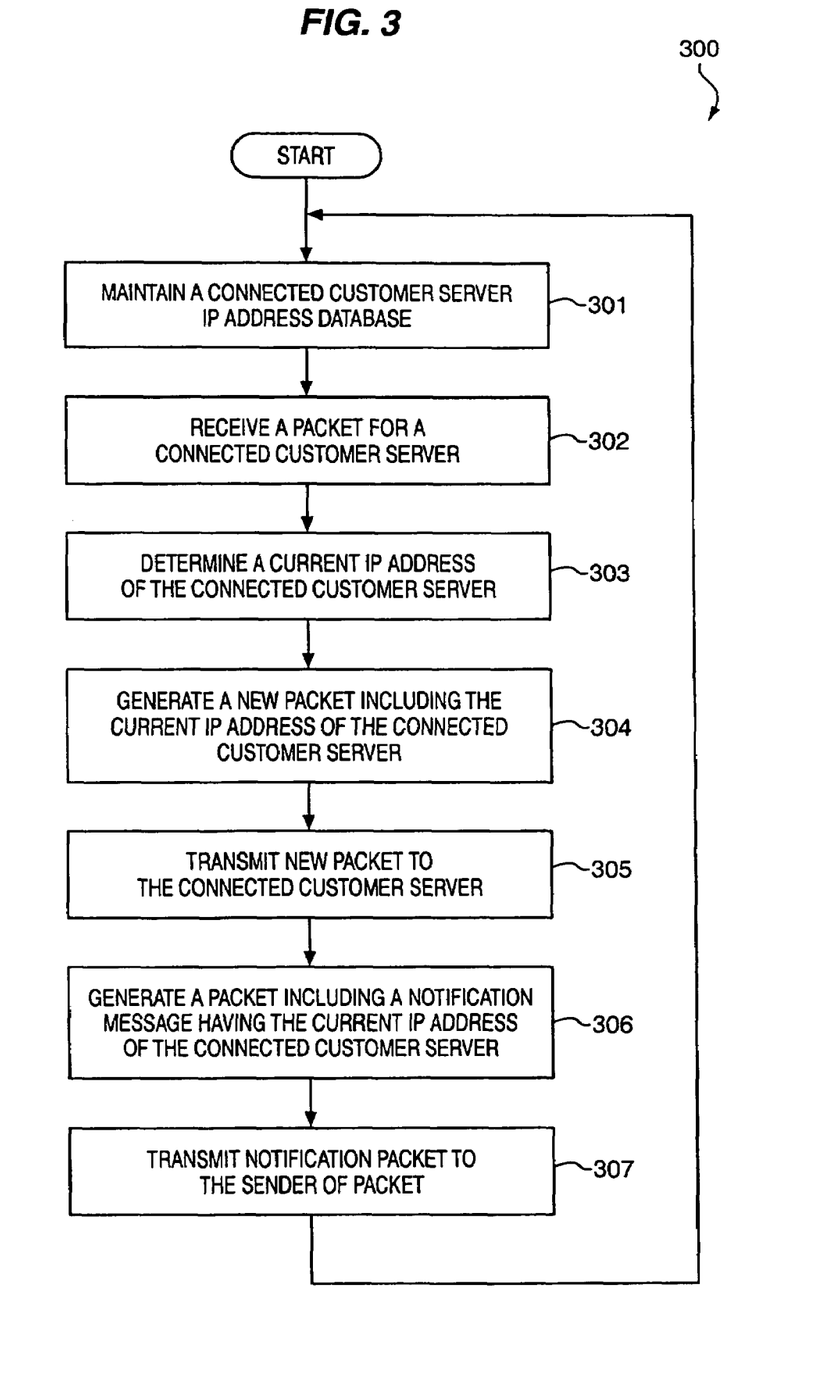
FIG. 3 illustrating an embodiment of an overview process executed by a service provider server to provide a permanent IP address pointer.

FIG. 3 illustrates steps of a process 300 executed by service provider server 101 to provide packet forwarding in accordance with this invention. One skilled in the art will recognize that any number of methods and programming languages can be used to design executable instructions that perform process 300.

Process 300 begins in step 301 with service provider server 101 maintaining a connected customer server current IP address database. The connected customer server current IP address database is a storage program used to maintain a record of current IP addresses of connected customer servers fur use in forwarding packets to the connected customer servers.

In step 302, the service provider server receives a packet addressed to the connected customer server. In step 303, process 300 determines a current IP address of the connected customer server. In step 304, process 300 generates a new packet including the current IP address of the connected customer server that is determined in step 303. The service provider server then transmits the new packet to the connected customer server in step 305. In step 306, a packet including the current IP address of the connected customer server may optionally be generated. Process 300 may then transmit the packet to the sender of the received packet in step 307 to notify the sender of the current IP address of the connected customer server for further communications. Process 300 is then repeated as more packets are received.

Figure 4:
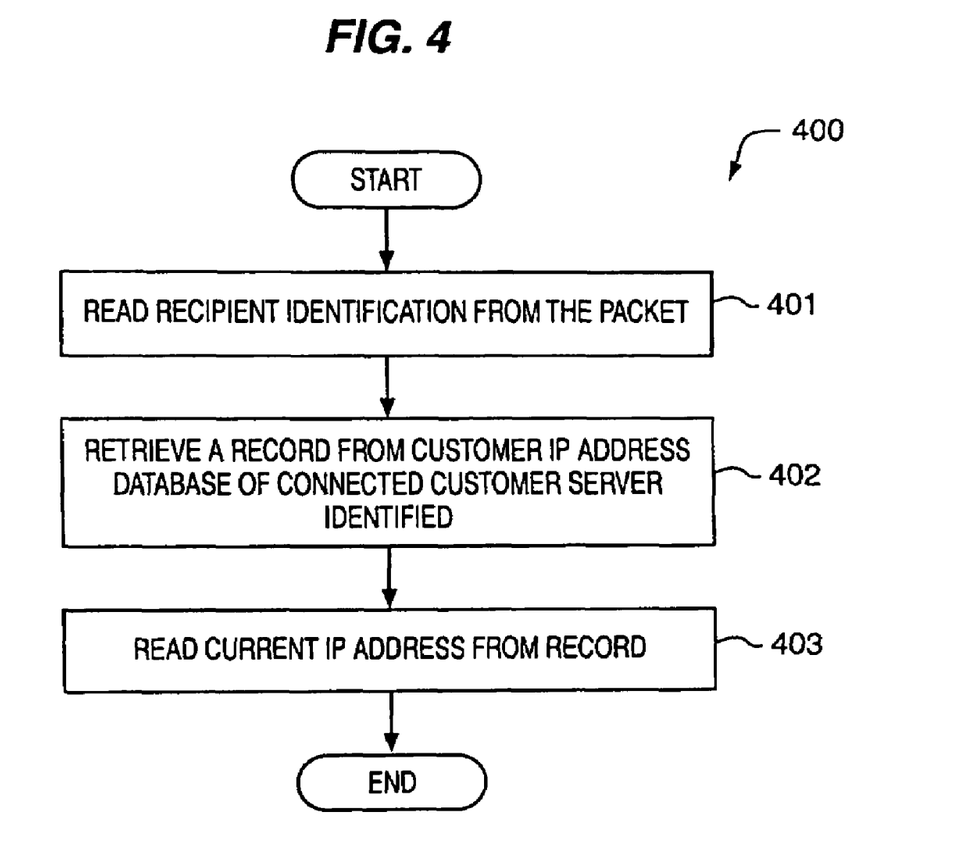
FIG. 4 illustrating an embodiment of a process executed by a service provider server for determining a current IP address of a connected customer server.

FIG. 4 illustrates a process 400 for determining the current IP address of a connected customer server when a packet is received. Process 400 begins in step 401 by reading a recipient identification from the packet received. The recipient identification may be an IP address used by the service provider server to identify a particular connected customer server. In step 402, process 400 retrieves a record for the recipient identification from a connected customer server IP address database. In step 403 process 400 reads the current IP address of the connected customer server from the retrieved record and process 400 ends.

Figure 5:
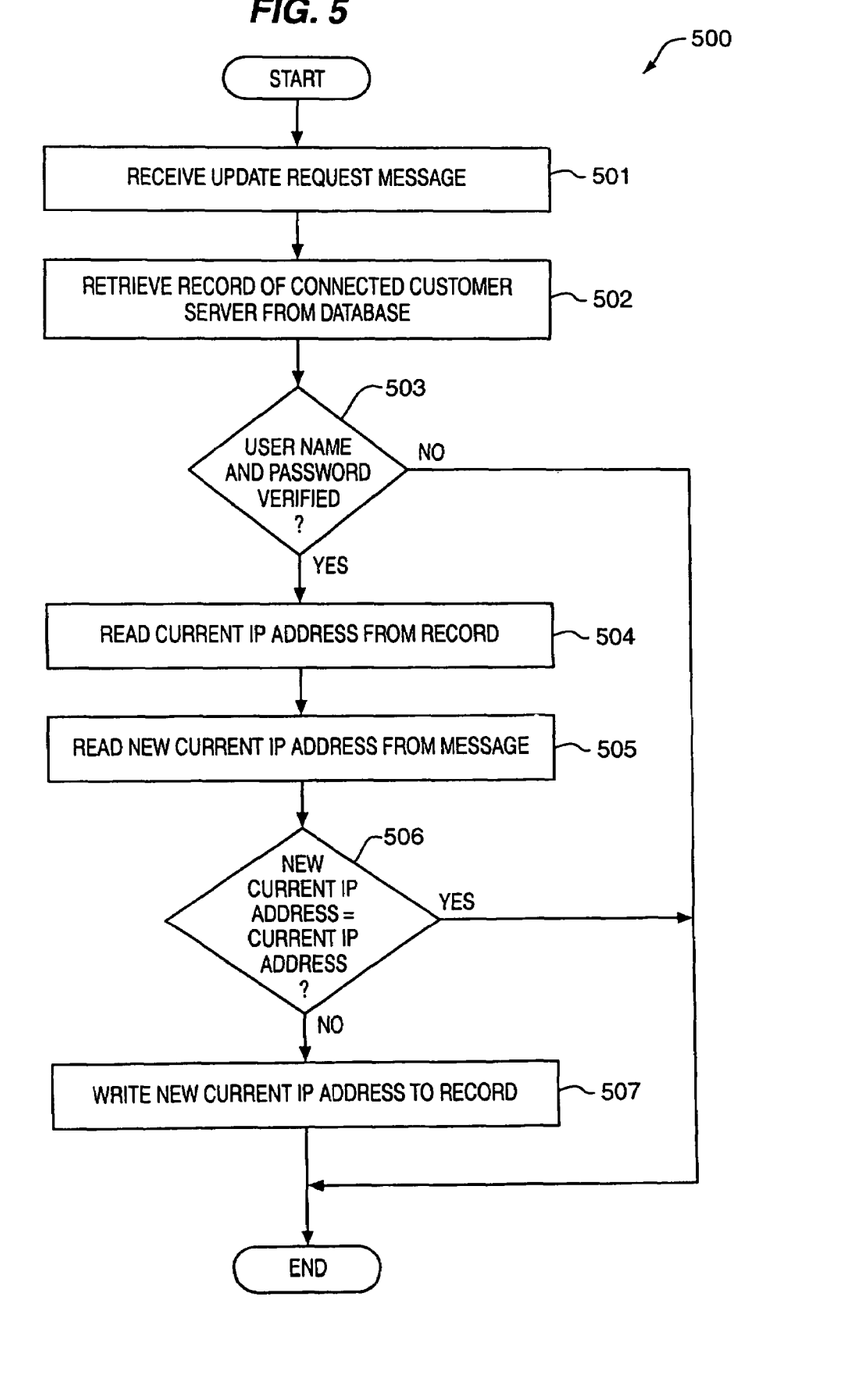
FIG. 5 illustrating an embodiment of operations of a flow diagram for an update process for maintaining a current IP address database of connected customer servers.

In order to determine the current IP address of the connected customer server, the service provider server must maintain a database of current IP addresses in an embodiment. FIG. 5 illustrates a process 500 for updating records in a database to indicate a current IP address of a connected customer server when the current customer server IP address changes.

Process 500 begins in step 501 with the service provider server receiving an update request message. One skilled in the art will recognize that the update request message is a packet containing the required information from either the connected customer server or the DHCP server, which may be a separate executable program run by the service provider server.

In step 502, process 500 retrieves a record for the identified connected customer server. Process 500 determines whether the username and password supplied are verified in step 503. This is a security precaution to assure non-authorized changing of the current IP address of a connected customer server. This prevents others from changing the IP address to the address of a competitor or other server. If the username and password are not verified, process 500 ends.

If the username and password are verified, process 500 reads the current IP address of the connected customer server from the record in step 504. In step 505, process 500 reads a new current IP address from the update request message. In step 506, process 500 determines whether the new current IP address read from the update request message equals the current IP address read from the record. If the new current IP address equals the stored current IP address, process 500 ends. Otherwise, process 500 writes the new current IP address into the record in step 507 and process 500 ends.

Figure 6:
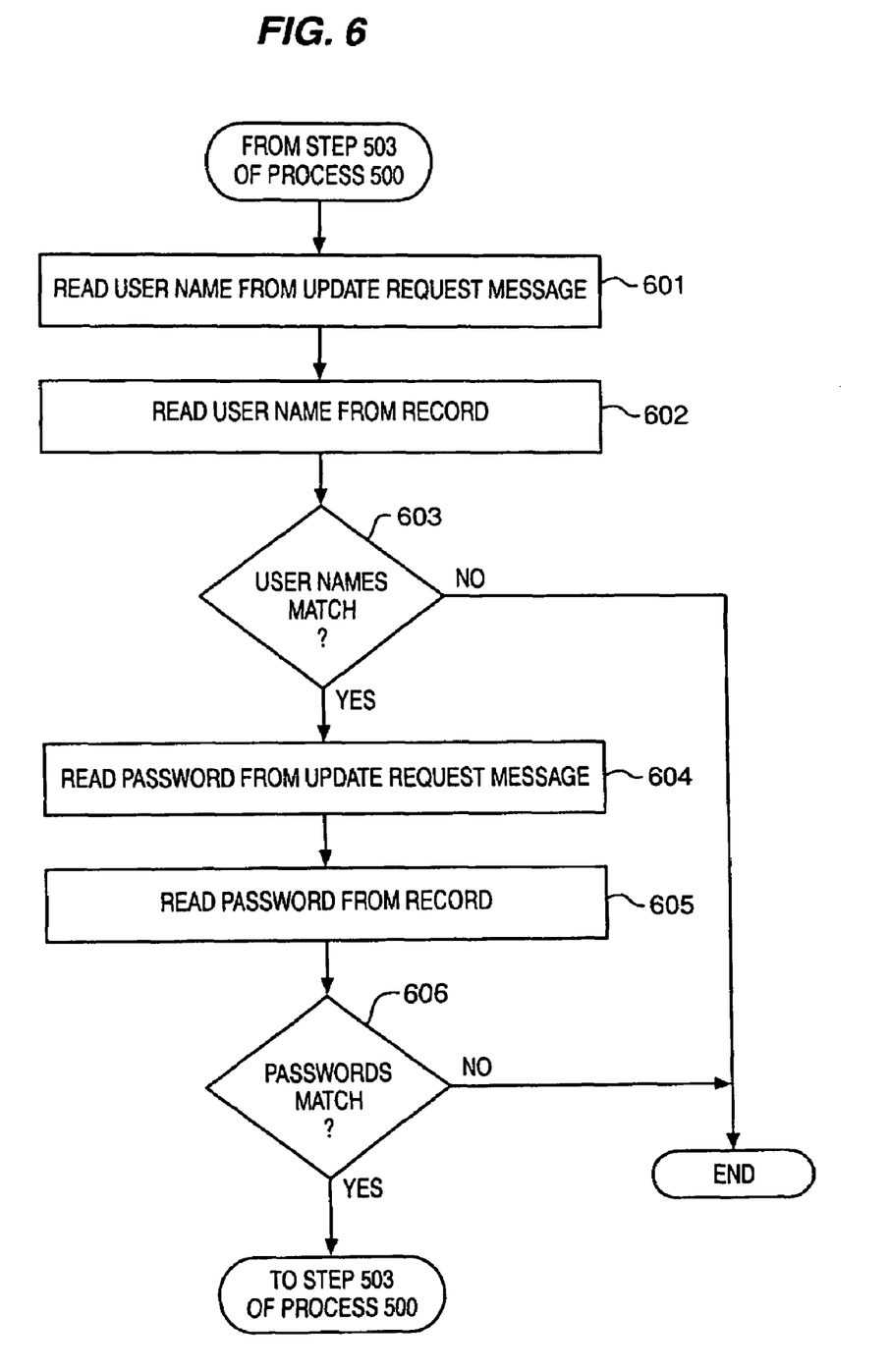
FIG. 6 illustrating an embodiment of operations of a flow diagram for an exemplary process for verifying a username and password.

In order to verify the username and password in step 503 of process 500, the service provider server may execute a comparison routine. FIG. 6 illustrates an exemplary compare process 600. Process 600 begins in step 601 by reading a username from the update request message. In step 602, process 600 reads the username from the record. The usernames read from the update request message and the records are compared in step 603. If the usernames do not match process 600 ends causing process 500 (FIG. 5) to end.

If the usernames match, process 600 reads a password from the update request message in step 604. In step 605, process 600 reads a password from the record. In step 606, process 600 compares the password to determine whether the passwords match. If the passwords do not match, process 600 ends causing process 500 (FIG. 5) to end. If the passwords match, process 600 allows process 500 to continue to step 504.

Figure 7:
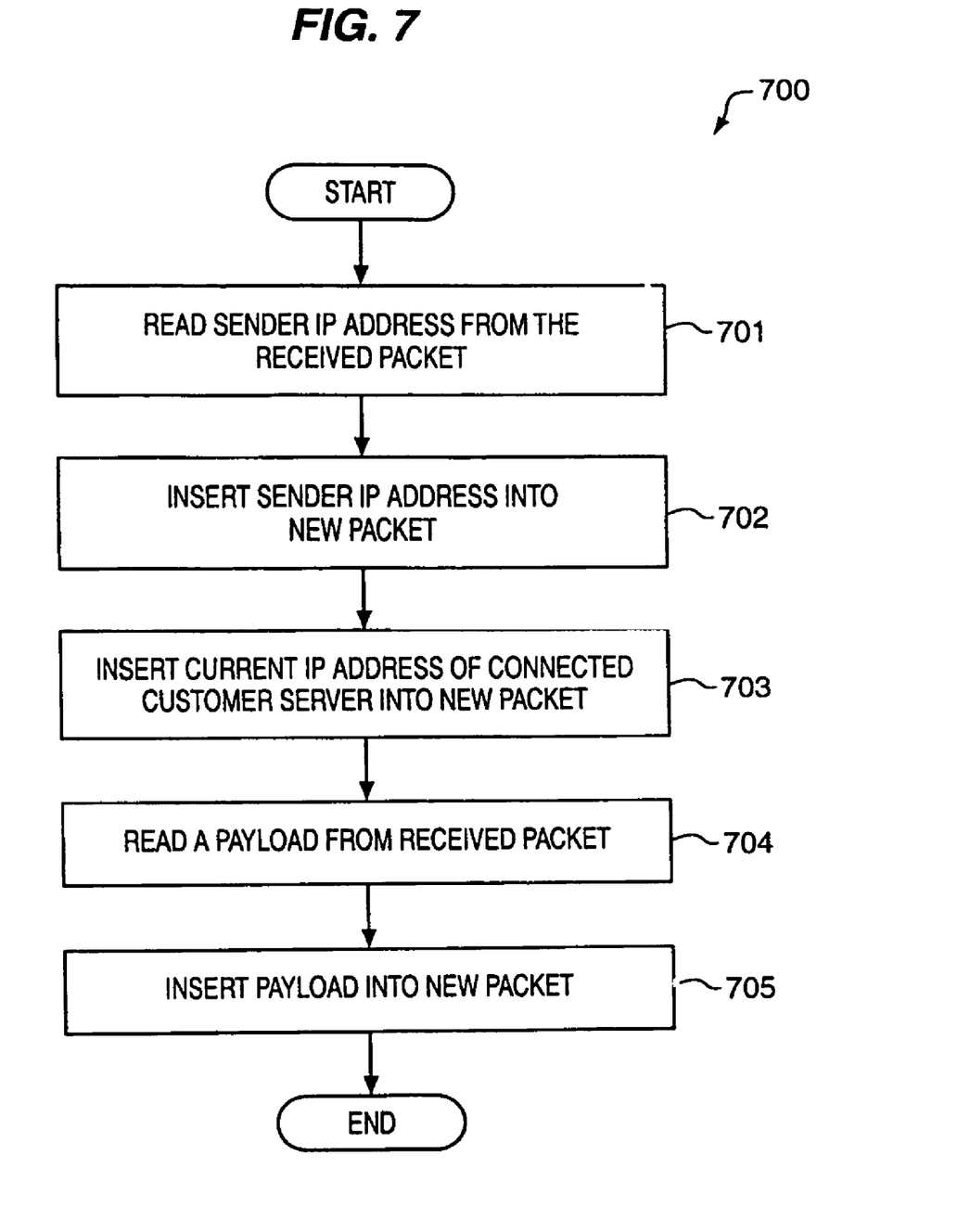
FIG. 7 illustrating an embodiment of operations of a flow diagram of a process for generating a new packet containing a current IP address of a connected customer server in accordance with this invention.

In order to generate a new packet having the current IP address of the connected customer server, the service provider server may masquerade as the connected IP server and receive and forward packets for the server. Alternatively, the service provider server transmits a message to the sender system indicating the new address. In a second alternate, the service provider server may replace a recipient IP address in the received packet. In a third alternative, the service provider server may generate an entirely new packet from the contents of the received packet. FIG. 7 illustrates a flow diagram of an exemplary process for generating a new packet.

Process 700 begins in step 701 by reading a sender IP address from the received packet. In step 702, process 700 inserts the sender IP address into a new packet. In step 703, process 700 inserts the current IP address of the connected customer server into the new packet as the recipient of the packet. In step 704, the payload of the received packet is read. The payload is the data contained in the packet. In step 705, the payload read from the received packet is inserted into the payload of the new packet and process 700 ends.

Figure 8:
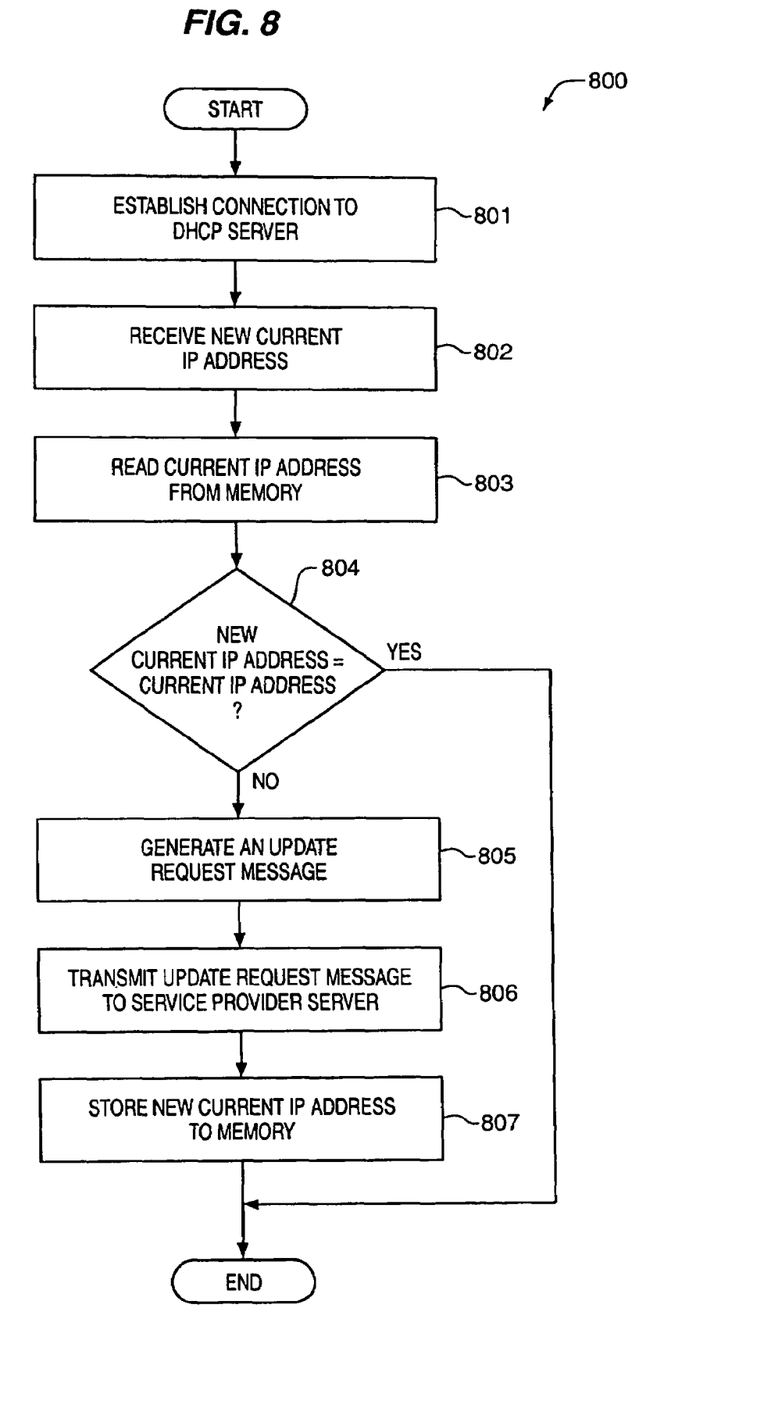
FIG. 8 illustrating an embodiment of operations of a flow diagram of a process executed by a connected customer server to update a current IP address of the connected customer server.

In order to maintain the database, the service provider server must know when the current IP address of a connected customer server changes. FIG. 8 illustrates an exemplary process 800 for informing the service provider server when a current IP address of a connected customer server changes. In an embodiment, the connected customer server executes process 800. However, it is envisioned that a DHCP server which assigns IP addresses may also directly notify the service provider server. The computer system executing process 800 is therefore left to those skilled in the arts.

Process 800 begins in step 801 with the connected customer server establishing a connection with a DHCP server. In step 802, a new current IP address of the connected customer server is received. In step 803, the current IP address of the connected customer is read from a location in memory. The new current IP address is then compared to the current IP address read from memory in step 804. If the new current IP address equals the current IP address stored in memory, process 800 ends without sending notification since the current IP address has not changed.

If the new current IP address is not equal to the stored current IP address, process 800 generates an update request message in step 805. The update request message is one or more data packets that contain the necessary information needed to perform an update of the database.

In step 806, process 800 transmits the update request message to the service provider server. Process 800 ends in step 807 by storing the new current IP address in the memory location of the current IP address for future use.

Figure 9:
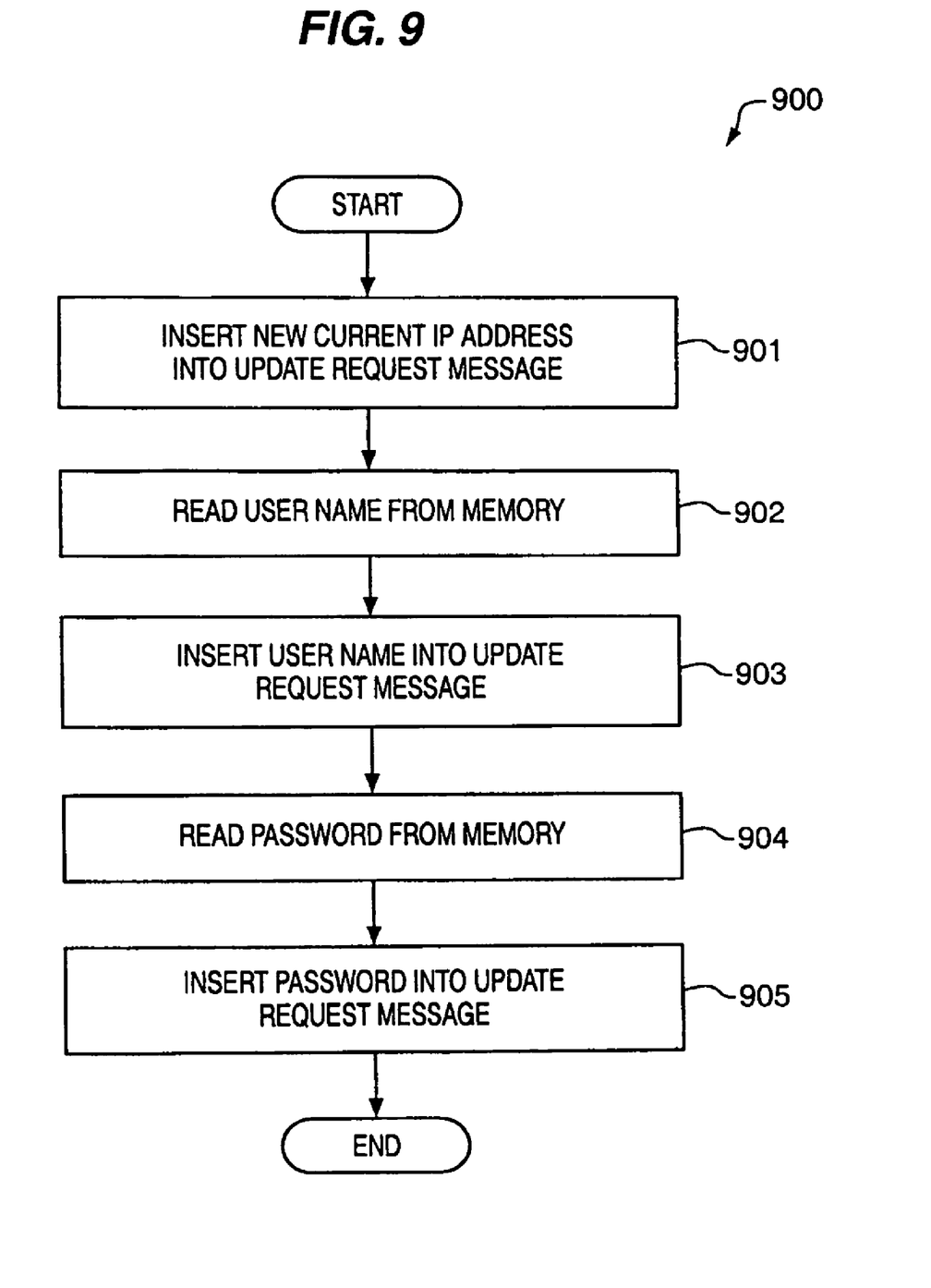
FIG. 9 illustrating an embodiment of operations of a flow diagram of a process executed by a connected customer server to generate an update request message.

FIG. 9 illustrates a process 900 for generating an update request message in step 804 of process 800. Process 900 begins in step 901 with process 900 inserting the new current IP address into the update request message. In step 902, process 900 reads a username from memory. Process 900 inserts the username into the update request message in step 903. In step 904, process 900 reads a password from memory. The password is inserted into the update request message in step 905 and process 900 ends.

When the operations of computers or servers are implemented in software it should be noted that the software can be stored on any computer-readable medium for use by or in connection with any computer related system or method. In the context of this document, a computer-readable medium is an electronic, magnetic, optical, or other physical device or means that can contain or store a computer program for use by or in connection with a computer related system or method. Computers or servers can be embodied in any computer-readable medium for use by or in connection with an instruction execution system, apparatus, or device such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. For example, the computer-readable medium can be, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured via optical scanning of the paper or other medium and then compiled, interpreted or otherwise processed in a suitable manner, if necessary, and stored in a computer memory.

In an alternative embodiment, where computers or servers are implemented in hardware, they can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

What is claimed is:

1. A method that provides packet forwarding to a connected customer computer that does not have a static internet Protocol (IP) address, comprising the steps of:
   receiving a packet for said connected customer computer at a service provider server;
   determining a current IP address of said connected customer computer at the service provider server;
   generating a new packet containing said current IP address;
   transmitting said new packet to said customer computer;
   receiving a new current IP address in said connected customer computer;
   determining whether said new current IP address matches said current IP address in said connected customer computer; and
   transmitting an update request message from said connected customer computer to said service provider computer responsive to said new current IP address not matching said current IP address.

2. The method of claim 1 further comprising the step of: maintaining a customer Internet Protocol (IP) address database that includes said current IP address of said connected customer computer.

3. The method of claim 2 wherein said step of determining said current IP address comprises the steps of: retrieving a record of said connected customer computer from said customer IP address database; and reading said current IP address from said record.

4. The method of claim 2 wherein said step of maintaining said customer IP address database comprises the step of: updating a record for a connected customer computer responsive to said current IP address of said connected customer computer changing.

5. The method of claim 4 wherein said step of updating said record comprises the steps of: receiving an update request message from said connected customer computer; verifying a username and password in said message; and receiving said current IP address in said message.

6. The method of claim 5 wherein said step of verifying said username and password comprises the steps of: reading said username from said message; reading said password from said message; reading username and password from said record; and comparing said username and password in said record to said username and password read from said message.

7. The method of claim 5 wherein said step of updating said connected customer IP address database comprises the step or: preventing said update responsive to said username and password not being verified.

8. The method of claim 5 wherein said step of updating said record comprises the steps of; determining whether said current IP address in said update request message matches said current IP address in said record; and replacing said current IP address in said record with said current IP address in said message responsive to said current IP address in said record not matching said IP address in said record.

9. The method of claim 1 wherein said step of generating said new packet comprises the step of: replacing art IP address of said connected customer computer in said packet with said Current IP address.

10. The method of claim 1 wherein said step of generating said new packet comprises the steps of: reading a sender IP address from said received packet; inserting said sender IP address in said new packet; inserting said current IP address in said packet; reading a payload from said received packet; and inserting said payload into said new packet.

11. The method of claim 1 further comprising the step of: transmitting a packet with said current IP address of said connected customer computer to a sender.

12. The method of claim 1 further comprising the step of: storing said now current IP address in a memory responsive to said new current IP address not matching said current IP address.

13. The method of claim 1 wherein said step of determining whether said new current IP address matches said current IP address comprises the steps of: reading said current IP address from memory in said connected customer computer; and comparing said current IP address from memory to said new current IP address in said connected customer computer.

14. The method of claim 1 further comprising the step of: generating said update request message.

15. The method of claim 14 wherein said step generating said update request message comprises the step of inserting said new current IP address in said update request message.

16. The method of claim 14 wherein said step of generating said update request message comprises the steps of: inserting a username into said update request message; and inserting a password into said update request message.

17. A method that provides packet forwarding to a connected customer computer that does not have a static internet Protocol (IP) address, comprising the steps of:
   establishing a connection between a connected customer computer and a dynamic host configuration protocol (DHCP) server;
   receiving a new current IP address at the connected customer computer from the DHCP server;
   sending an update request message from the connected customer computer to the service provider server regarding the new current IP address;
   storing the new current IP address of the connected customer computer in a database at the service provider server;
   receiving a packet for the connected customer computer at the service provider server, wherein the packet includes a recipient identification IP address used to identify the connected customer computer by the service provider;
   determining the new current IP address of the connected customer computer from the database; and
   forwarding packet for the connected customer computer using the new current IP address of the connected customer computer to enable a user of the connected customer computer to maintain a relatively inexpensive temporary internet connection while retaining a permanent address on the internet that can be propagated through other servers on the internet to provide a searchable permanent address for the user on the internet.

18. A method as in claim 17, wherein forwarding the packet further comprises forwarding the packet for the connected customer computer by replacing the recipient identification IP address in the packet with the new current IP address.

19. A method as in claim 17, wherein forwarding the packet further comprises forwarding the packet for the connected customer computer by generating an entirely new packet from the contents of the received packet and directing the new packet to the connected customer computer using the new current IP address.

* * * * *

UNITED STATES PATENT AND TRADEMARK OFFICE
CERTIFICATE OF CORRECTION

PATENT NO. : 7,463,594 B2  Page 1 of 1
APPLICATION NO. : 11/087133
DATED : December 9, 2008
INVENTOR(S) : Terrence Lee Adsitt It is certified that error appears in the above-identified patent and that said Letters Patent is hereby corrected as shown below:

In column 4, line 47, delete "fur" and insert -- for --, therefor.

In column 7, line 25, in Claim 1, delete "internet" and insert -- Internet --, therefor.

In column 8, line 3, in Claim 7, delete "or:" and insert -- of: --, therefor.

In column 8, line 6, in Claim 8, delete "of;" and insert -- of: --, therefor.

In column 8, line 13, in Claim 9, delete "art" and insert -- an --, therefor.

In column 8, line 15, in Claim 9, delete "Current" and insert -- current --, therefor.

In column 8, line 26, in Claim 12, delete "now" and insert -- new --, therefor.

In column 8, line 37, in Claim 15, after "step" insert -- of --.

In column 8, line 45, in Claim 17, delete "internet" and insert -- Internet --, therefor.

In column 8, line 64, in Claim 17, after "forwarding" insert -- the --.

Signed and Sealed this

Twenty-sixth Day of May, 2009

JOHN DOLL
*Acting Director of the United States Patent and Trademark Office*